US012688762B2

(12) United States Patent
Lin et al.

(10) Patent No.: US 12,688,762 B2
(45) Date of Patent: Jul. 21, 2026

(54) VIBROTACTILE DEVICE

(71) Applicant: Cooler Master Technology Inc., Taipei City (TW)

(72) Inventors: Chi-Min Lin, Taipei City (TW); Yao Shiao, Taipei City (TW); Chun-Ta Chen, Taipei City (TW); Shang che Lee, Taipei City (TW); Ming Wan Lien, Taipei City (TW)

(73) Assignee: Cooler Master Technology Inc., Taipei City (TW)

( * ) Notice: Subject to any disclaimer, the term of this patent is extended or adjusted under 35 U.S.C. 154(b) by 181 days.

(21) Appl. No.: 18/518,592

(22) Filed: Nov. 23, 2023

(65) Prior Publication Data

US 2024/0169813 A1 May 23, 2024

(30) Foreign Application Priority Data

Nov. 23, 2022 (TW) .................................. 111144745

(51) Int. Cl.
*G08B 6/00* (2006.01)
*H04R 3/04* (2006.01)
*G10G 7/00* (2006.01)

(52) U.S. Cl.
CPC ................. *G08B 6/00* (2013.01); *H04R 3/04* (2013.01); *G10G 7/00* (2013.01)

(58) Field of Classification Search
CPC ............... G08B 6/00; H04R 3/04; G10G 7/00
USPC ....................................................... 340/407.1
See application file for complete search history.

(56) References Cited

U.S. PATENT DOCUMENTS 5,719,561 A * 2/1998 Gonzales ................. G08B 6/00 340/407.1
6,027,463 A * 2/2000 Moriyasu ........... A61H 23/0236 601/48
8,019,486 B2 9/2011 Rawls-Meehan
9,710,061 B2 * 7/2017 Pance .................... H03K 17/96
10,133,351 B2 * 11/2018 Weber ...................... G06F 3/016
10,254,840 B2 * 4/2019 Weinraub ................ G06F 3/167
10,628,484 B2 4/2020 Choudhury et al.
(Continued)

FOREIGN PATENT DOCUMENTS

EP 4374842 A1 * 5/2024 ............... H04R 3/00
KR 20040004459 A 1/2004
(Continued)

*Primary Examiner* — Jack K Wang
(74) *Attorney, Agent, or Firm* — Merchant & Gould P.C.

(57) ABSTRACT

A vibrotactile device and method including an audio signal input unit, manual parameter input unit, microcontroller, vibration motor controller, and at least one vibration motor are provided. The microcontroller is coupled to the audio signal input unit and manual parameter input unit. The vibration motor controller is coupled to the microcontroller and the at least one vibration motor. At least one signal is generated by at least the audio signal input unit or the manual parameter input unit. A modulated signal is generated based, in part, on a filtered signal from the audio signal input unit and a vibration duty cycle is generated, based on a tempo value and a note value of the manual parameter input unit, to generate at least one driving parameter, respectively. The vibration motor controller drives the at least one vibration motor based on the at least one driving parameter.

15 Claims, 9 Drawing Sheets

(56) References Cited

U.S. PATENT DOCUMENTS

| | | | | |
|---|---|---|---|---|
| 10,721,265 | B2 | 7/2020 | Tian et al. | |
| 10,936,071 | B2 * | 3/2021 | Pandya | G04G 21/08 |
| 11,024,135 | B1 * | 6/2021 | Ostdiek | G08B 6/00 |
| 12,089,953 | B1 * | 9/2024 | Guo | G06F 3/015 |
| 2009/0156266 | A1 * | 6/2009 | Linjama | H04M 19/04 455/567 |
| 2017/0098350 | A1 * | 4/2017 | Ebeling | G08B 6/00 |
| 2018/0181204 | A1 * | 6/2018 | Weinraub | G06F 3/016 |
| 2020/0249633 | A1 * | 8/2020 | Matsumoto | G10H 1/42 |
| 2025/0216999 | A1 * | 7/2025 | Andree | G06F 3/1454 |

FOREIGN PATENT DOCUMENTS

| | | |
|---|---|---|
| TW | I490778 B | 7/2015 |
| TW | I492776 B | 7/2015 |

* cited by examiner

VIBROTACTILE DEVICE

RELATED APPLICATIONS

This U.S. application claims the benefit of priority to Taiwan application no. 111144745, filed on Nov. 23, 2022, of which is incorporated herein by reference in its entirety.

TECHNICAL FIELD

The present disclosure is related to the field of haptics in general and more particularly but not limited to vibrotactile devices.

BACKGROUND OF THE INVENTION

Vibrotactile technology can enhance user experience, encourage engagement, and improve accuracy by providing tactile sensations, such as vibrations or pulses, to convey information. Vibrotactile technology can be found in the gaming and entertainment, medical, robotics, virtual reality, and music fields.

In the music field, vibrotactile feedback can be applied to support deaf people in music, to augment sound perception for musicians, for remote musical collaboration, and to enhance musical experience.

Vibrotactile devices applied in the music field often require processing of digital signals into vibrotactile signals. However, currently, the vibrotactile signal parameters are limited and of little variability.

SUMMARY OF THE INVENTION

The present disclosure provides a vibrotactile device and a method for providing vibrotactile sensations including an audio signal input unit, a manual parameter input unit, a microcontroller, a vibration motor controller, and at least one vibration motor. At least one signal is generated by at least the audio signal input unit or the manual parameter input unit, thus, providing multiple means for obtaining the at least one signal, and offering variability for driving the at least one vibration motor via at least one driving parameter based, at least in part, on the at least one signal.

In at least one embodiment, the vibrotactile device includes an audio signal input unit, a manual parameter input unit, a microcontroller, a vibration motor controller, and at least one vibration motor. The microcontroller is coupled to the audio signal input unit and coupled to the manual parameter input unit. The vibration motor controller is coupled to the microcontroller and the at least one vibration motor is coupled to the vibration motor controller. At least one signal is generated by at least the audio signal input unit or the manual parameter input unit. The microcontroller generates at least one driving parameter based, at least in part, on the at least one signal, wherein the vibration motor controller drives the at least one vibration motor based on the at least one driving parameter.

In at least one embodiment, the vibrotactile device further includes an audio processor coupled between the audio signal input unit and the microcontroller. The audio processor performs low-pass filtering by attenuating frequencies above a threshold frequency while passing signals below the threshold frequency of the at least one signal to generate a filtered signal. A modulated signal is generated based on a comparison between the filtered signal with a vibration motor rated speed of the at least one vibration motor. The threshold frequency is 100 Hz. In at least one embodiment, the audio processor further generates the modulated signal based on corresponding an amplitude of the filtered signal to an amplitude of the at least one vibration motor and corresponding a frequency of the filtered signal to a frequency of the at least one vibration motor.

In at least one embodiment, the microcontroller generates a vibration duty cycle based on a tempo value and a note value of a beat setting of the manual parameter input unit to generate the at least one driving parameter. In at least one embodiment, the microcontroller further generates the vibration duty cycle by dividing a first value by a second value. The first value is generated by dividing a preset duty cycle length of the at least one vibration motor by the tempo value. The second value is generated by dividing a preset note value of the at least one vibration motor by the note value. In at least one embodiment, the microcontroller further generates the vibration duty cycle, prior to dividing the first value by the second value by determining whether the tempo value is within a preset tempo value range of the at least one vibration motor. Next, at least a second tempo value is received when the tempo value is not within the preset tempo value range and whether the at least a second tempo value is within the preset tempo value range is determined. Following, receiving of the at least a second tempo value and determining whether the at least a second tempo value is within the preset tempo value range is repeated when the at least a second tempo value is not within the preset tempo value range. Next, whether the note value is within a preset note value range of the at least one vibration motor is determined when at least the tempo value or the at least a second tempo value is within the preset tempo value range. After, at least a second note value is received when the note value is not within the preset note value range and whether the at least a second note value is within the preset note value range is determined. Next, repeating receival of the at least a second note value and repeating determination of whether the at least a second note value is within the preset note value range when the at least a second note value is not within the preset note value range. Following, the tempo value and the note value for generation of the vibration duty cycle are determined.

In at least one embodiment, the at least one vibration motor includes a plurality of vibration motors. The microcontroller further generates the at least one driving parameter by identifying each of the plurality of vibration motors of an amount setting of the manual parameter input unit and generating the vibration duty cycle based on the tempo value and the note value of each of the plurality of vibration motors. In at least one embodiment, the microcontroller drives each of the plurality of vibration motors by driving an $N^{th}$ vibration motor of the plurality of vibration motors. Next, an $N^{th}$ operation duty cycle of the $N^{th}$ vibration motor is generated and whether the $N^{th}$ operation duty cycle reaches a vibration duty cycle of the $N^{th}$ vibration motor is determined. At least an $N^{th}$ second operation duty cycle is generated when the $N^{th}$ operation duty cycle does not reach the vibration duty cycle and whether the $N^{th}$ second operation duty cycle reaches the vibration duty cycle is determined. Next, repeating generation of the at least an $N^{th}$ second operation duty cycle and repeating determination of whether the at least an $N^{th}$ second operation duty cycle reaches the vibration duty cycle when the at least an $N^{th}$ second operation duty cycle does not reach the vibration duty cycle is repeated. Following, whether the $N^{th}$ vibration motor corresponds to the amount setting is determined when at least the $N^{th}$ second operation duty cycle or the at least an $N^{th}$ second operation duty cycle does reach the vibration duty cycle. Next, driving of the $N^{th}$ vibration motor is continued when the $N^{th}$ operation duty cycle corresponds to the amount setting. Further, driving of the $N^{th}$ vibration motor is stopped when the $N^{th}$ operation duty cycle does not correspond to the amount setting and an $(N+1)^{th}$ vibration motor of the plurality of vibration motors is driven. N is a positive integer and (N+1) is equal to or less than the amount setting.

In at least one embodiment, the microcontroller further generates the at least one driving parameter by determining an operation sequence of each of the plurality of vibration motors of a sequence setting of the manual parameter input unit and determining a vibration intensity of each of the plurality of vibration motors of a vibration intensity setting of the manual parameter input unit. In at least one embodiment, the microcontroller further generates the vibration duty cycle, prior to driving each of the plurality of vibration motors, by determining whether the amount setting corresponds to a preset amount setting range of the plurality of vibration motors. Next, at least a second amount setting is received when the amount setting does not correspond to the preset amount setting range and whether the at least a second amount setting is within the preset amount setting range is determined. Receiving of the at least a second amount setting and determining whether the at least a second amount setting is within the preset amount setting range are repeated when the at least a second amount setting is not within the preset amount setting range. An operation sequence of an $N^{th}$ vibration motor of the plurality of vibration motors is determined when at least the amount setting or the at least a second amount setting is within the preset amount setting range. Next, whether the $N^{th}$ vibration motor corresponds to the amount setting is determined and an operation sequence of at least an $(N+1)^{th}$ vibration motor of the plurality of vibration motors is determined when the $N^{th}$ vibration motor does not correspond to the amount setting. Following, a vibration intensity of at least the $N^{th}$ vibration motor or the at least the $(N+1)^{th}$ vibration motor is determined when the $N^{th}$ vibration motor or the at least the (N+1) th vibration motor does correspond to the amount setting. Whether at least the $N^{th}$ vibration motor or the at least the $(N+1)^{th}$ vibration motor corresponds to the amount setting is next determined. A vibration intensity of at least the at least an $(N+1)^{th}$ vibration motor or at least an $(N+1+1)^{th}$ vibration motor is determined when at least the $N^{th}$ vibration motor or the at least an $(N+1)^{th}$ vibration motor does not correspond to the amount setting. Following, a final setting of manual input parameters is determined when at least the $N^{th}$ vibration motor, the at least an $(N+1)^{th}$ vibration motor, or the at least an (N+1+1) th vibration motor does correspond to the amount setting.

In at least one embodiment, the method for providing vibrotactile sensations for an interface device includes at least one of at least two input units generating at least one signal. Next, a microcontroller generates at least one driving parameter, based, at least in part, on the at least one signal. Following, a vibration motor controller drives at least one vibration motor, based on the at least one driving parameter.

In at least one embodiment of the method, generating the at least one driving parameter includes attenuating frequencies above a threshold frequency while passing signals below the threshold frequency of the at least one signal of an audio signal input unit to generate a filtered signal. Next, the filtered signal is compared with a vibration motor rated speed of the at least one vibration motor to generate a modulated signal. The threshold frequency is 100 Hz. In at least one embodiment of the method, generating the modulated signal further includes corresponding an amplitude of the filtered signal to an amplitude of the at least one vibration motor and corresponding a frequency of the filtered signal to a frequency of the at least one vibration motor.

In at least one embodiment of the method, generating the at least one driving parameter includes generating a vibration duty cycle based on a tempo value and a note value of a beat setting of a manual parameter input unit. In at least one embodiment of the method, generating the vibration duty cycle further includes dividing a first value by a second value. The first value is generated by dividing a preset duty cycle length of the at least one vibration motor by the tempo value. The second value is generated by dividing a preset note value of the at least one vibration motor by the note value. In at least one embodiment of the method, generating the vibration duty cycle further includes, prior to dividing the first value by the second value, determining whether the tempo value is within a preset tempo value range of the at least one vibration motor. Next, at least a second tempo value is received when the tempo value is not within the preset tempo value range and determining whether the at least a second tempo value is within the preset tempo value range is determined. Following, receiving the at least a second tempo value and determining whether the at least a second tempo value is within the preset tempo value range are repeated when the at least a second tempo value is not within the preset tempo value range. Next, whether the note value is within a preset note value range of the at least one vibration motor is determined when at least the tempo value or the at least a second tempo value is within the preset tempo value range. Following, at least a second note value is received when the note value is not within the preset note value range and whether the at least a second note value is within the preset note value range is determined. Next, receiving of the at least a second note value and determining whether the at least a second note value is within the preset note value range are repeated when the at least a second note value is not within the preset note value range. Next, the tempo value and the note value for generation of the vibration duty cycle is determined.

In at least one embodiment of the method, the at least one vibration motor includes a plurality of vibration motors, and generating the at least one driving parameter includes identifying each of the plurality of vibration motors of an amount setting of the manual parameter input unit and generating the vibration duty cycle based on the tempo value and the note value of each of the plurality of vibration motors. In at least one embodiment of the method, driving each of the plurality of vibration motors includes driving an $N^{th}$ vibration motor of the plurality of vibration motors. Next, an $N^{th}$ operation duty cycle of the $N^{th}$ vibration motor is generated. Whether the $N^{th}$ operation duty cycle reaches a vibration duty cycle of the $N^{th}$ vibration motor is next determined. Following, at least an $N^{th}$ second operation duty cycle is generated when the $N^{th}$ operation duty cycle does not reach the vibration duty cycle and whether the $N^{th}$ second operation duty cycle reaches the vibration duty cycle is determined. Next, generating of the at least an $N^{th}$ second operation duty cycle and determining whether the at least an $N^{th}$ second operation duty cycle reaches the vibration duty cycle are repeated when the at least an $N^{th}$ second operation duty cycle does not reach the vibration duty cycle. Following, whether the $N^{th}$ vibration motor corresponds to the amount setting is determined when at least the $N^{th}$ second operation duty cycle or the at least an $N^{th}$ second operation duty cycle does reach the vibration duty cycle. Next, driving of the $N^{th}$ vibration motor when the $N^{th}$ operation duty cycle corresponds to the amount setting is continued. Driving of the $N^{th}$ vibration motor is stopped when the $N^{th}$ operation duty cycle does not correspond to the amount setting and an $(N+1)^{th}$ vibration motor of the plurality of vibration motors is driven. N is a positive integer and (N+1) is equal to or less than the amount setting.

In at least one embodiment of the method, generating the at least one driving parameter further includes determining an operation sequence of each of the plurality of vibration motors of a sequence setting of the manual parameter input unit and determining a vibration intensity of each of the plurality of vibration motors of a vibration intensity setting of the manual parameter input unit. In at least one embodiment of the method, generating the vibration duty cycle further includes, prior to driving each of the plurality of vibration motors, determining whether the amount setting corresponds to a preset amount setting range of the plurality of vibration motors. Next, at least a second amount setting is received when the amount setting does not correspond to the preset amount setting range and whether the at least a second amount setting is within the preset amount setting range is determined. Following, receiving of the at least a second amount setting and determining whether the at least a second amount setting is within the preset amount setting range are repeated when the at least a second amount setting is not within the preset amount setting range. Next, an operation sequence of an $N^{th}$ vibration motor of the plurality of vibration motors is determined when at least the amount setting or the at least a second amount setting is within the preset amount setting range. Following, whether the $N^{th}$ vibration motor corresponds to the amount setting is determined. Next, an operation sequence of at least an $(N+1)^{th}$ vibration motor of the plurality of vibration motors is determined when the $N^{th}$ vibration motor does not correspond to the amount setting. Next, a vibration intensity of at least the $N^{th}$ vibration motor or the at least the $(N+1)^{th}$ vibration motor is determined when the $N^{th}$ vibration motor or the at least the $(N+1)^{th}$ vibration motor does correspond to the amount setting. Following, whether at least the $N^{th}$ vibration motor or the at least the $(N+1)^{th}$ vibration motor corresponds to the amount setting is determined, and a vibration intensity of at least the at least an $(N+1)^{th}$ vibration motor or at least an $(N+1+1)^{th}$ vibration motor is determined when at least the $N^{th}$ vibration motor or the at least an $(N+1)^{th}$ vibration motor does not correspond to the amount setting. Next, a final setting of manual input parameters is determined when at least the $N^{th}$ vibration motor, the at least an $(N+1)^{th}$ vibration motor, or the at least an $(N+1+1)^{th}$ vibration motor does correspond to the amount setting.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of vibrotactile devices and methods for providing vibrotactile sensations for an interface device incorporating aspects of the presently disclosed principles are illustrated by way of example, and not by way of limitation.

DETAILED DESCRIPTION

The following describes various principles related to vibrotactile feedback by way of reference to specific examples of vibrotactile devices and methods for providing vibrotactile sensations for an interface device, including specific arrangements and examples of input units and microcontrollers embodying innovative concepts. More particularly, but not exclusively, such innovative principles are described in relation to selected examples of audio signal input units and manual parameter input units and methods providing multiple means for obtaining at least one signal and generating at least one driving parameter for driving at least one vibration motor, and well-known functions or constructions are not described in detail for purposes of succinctness and clarity. Nonetheless, one or more of the disclosed principles can be incorporated in various other embodiments of audio signal input units and manual parameter input units and methods thereincluded to achieve any of a variety of desired outcomes, characteristics, and/or performance criteria.

Thus, vibrotactile devices and methods for providing vibrotactile sensations for an interface device having attributes that are different from those specific examples discussed herein can embody one or more of the innovative principles, and can be used in applications not described herein in detail. Accordingly, embodiments of vibrotactile devices and methods for providing vibrotactile sensations for an interface device not described herein in detail also fall within the scope of this disclosure, as will be appreciated by those of ordinary skill in the relevant art following a review of this disclosure.

Example embodiments as disclosed herein are directed to vibrotactile systems, wherein user experiences are enhanced, engagement is encouraged and/or user accuracy is improved by the provision of tactile sensations to convey information. The vibrotactile systems can be implemented in the gaming and entertainment, medical, robotics, virtual reality, and music industries.

The vibrotactile system may be configured as a part of a drum stool, gaming weapon or massage or therapeutic device or equipment, providing vibrotactile feedback to a user. When configured as a drum stool, a plurality of vibration motors can be implemented within the drum stool. Multiple means for obtaining at least one signal, and variability is offered for driving the plurality of vibration motors of the drum stool. As an example, a sound of the bass drum can be felt through the vibrotactile system, enhancing a drummers senses and improving his/her performance.

Figure 1:
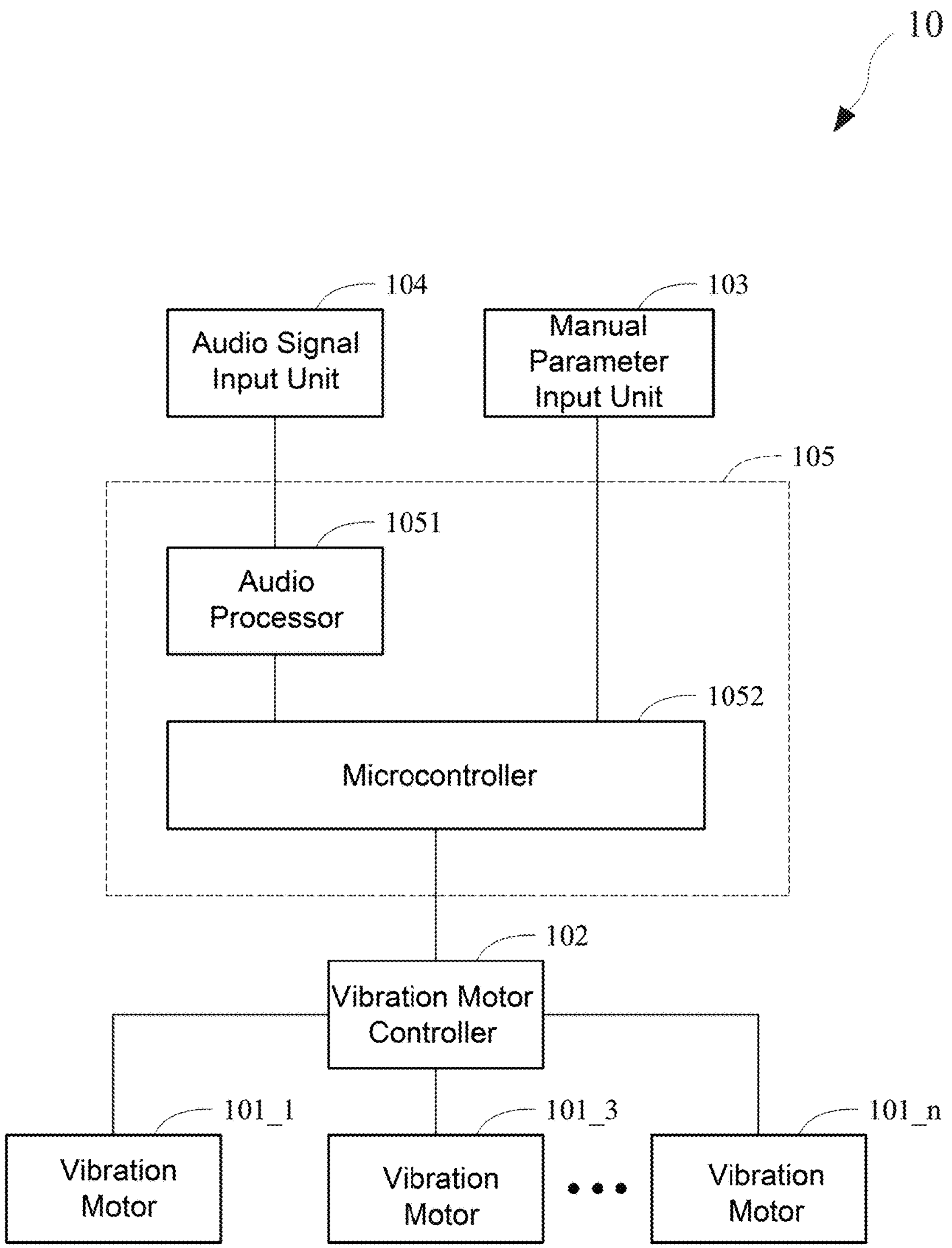
FIG. 1 is a diagram of a vibrotactile device according to one embodiment of the present disclosure.
Figure 2:
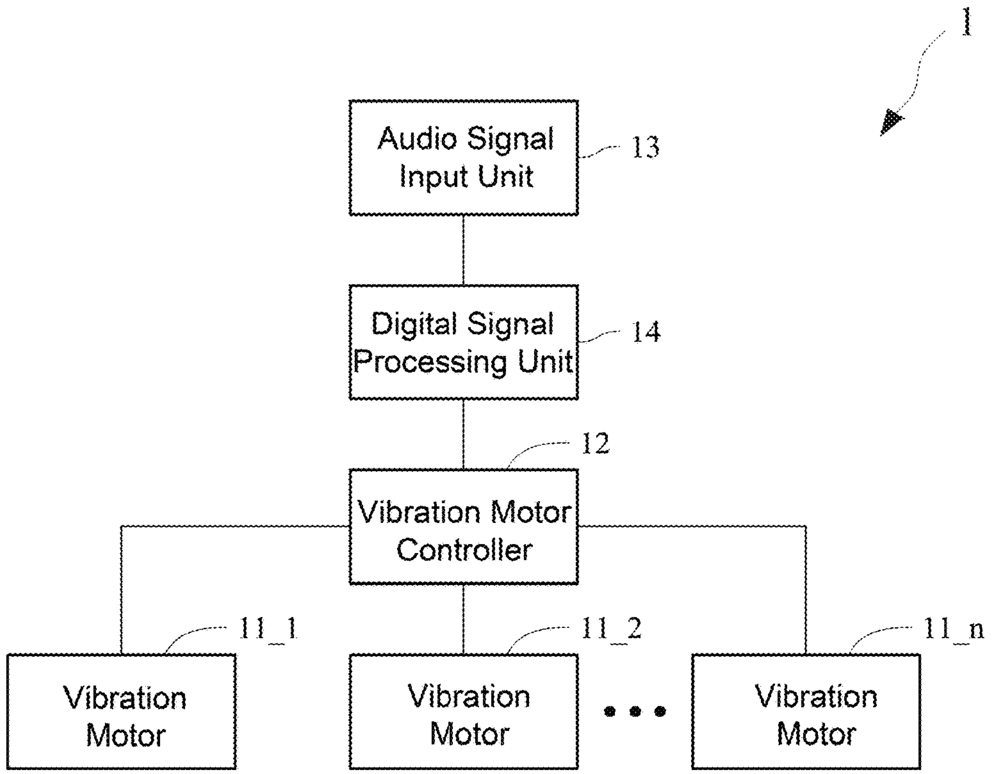
FIG. 2 is a diagram of another vibrotactile device according to one embodiment of the present disclosure.
Figure 3:
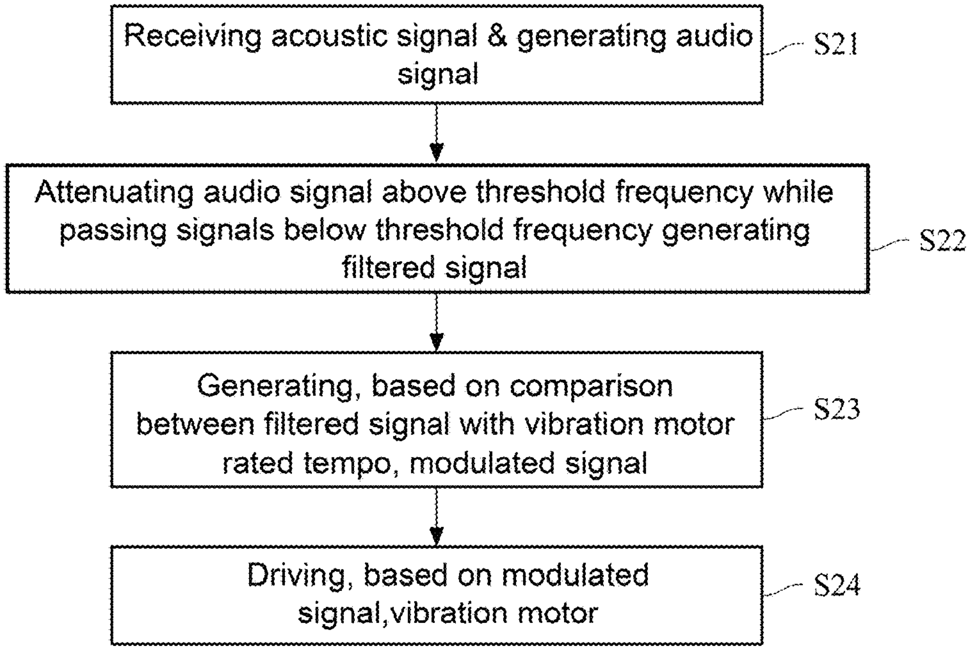
FIG. 3 is a process flow diagram illustrating a method for driving a vibration motor of the vibrotactile device of FIG. 2 according to one embodiment of the present disclosure.

FIG. 1 includes at least one embodiment of a vibrotactile device 10/1/5. The vibrotactile device 10/1/5 includes an audio signal input unit 104/13, a manual parameter input unit 103/53, a microcontroller 105/1051-1052/14/54, a vibration motor controller 102/12/52, and at least one vibration motor 101_1/11_1/51_1. The microcontroller 105/1051-1052/14/54 is coupled to the audio signal input unit 104/13 and coupled to the manual parameter input unit 103/53. The vibration motor controller 102/12/52 is coupled to the microcontroller 105/1051-1052/14/54 and the at least one vibration motor 101_1/11_1/51_1 is coupled to the vibration motor controller 102/12/52. At least one signal is generated (S21/S61) by at least the audio signal input unit 104/13 or the manual parameter input unit 103/53. The microcontroller 105/1051-1052/14/54 generates at least one driving parameter (S22/S23/S62) based, at least in part, on the at least one signal, wherein the vibration motor controller 102/12/52 drives (S24/S63) the at least one vibration motor 101_1/11_1/51_1 based on the at least one driving parameter (S22/S23/S62). In at least one embodiment, the vibrotactile device 10/1/5 can include a music mode via the audio signal input unit 104/13 and beat mode via the manual parameter input unit 103/53.

FIGS. 2 to 4D include another embodiment of a vibrotactile device 10/1/5. The vibrotactile device 10/1/5 further includes an audio processor 1051 coupled between the audio signal input unit 104/13 and the microcontroller 105/1052/14/54. The audio processor performs low-pass filtering by attenuating frequencies above a threshold frequency while passing signals below the threshold frequency of the at least one signal (FIG. 4A) to generate a filtered signal (FIG. 4B and FIG. 4C). A modulated signal is generated based on a comparison between the filtered signal with a vibration motor rated speed of the at least one vibration motor 101_1/11_1/51_1. The threshold frequency is 100 Hz. In at least one embodiment, the audio processor 1051 further generates the modulated signal based on corresponding an amplitude of the filtered signal to an amplitude of the at least one vibration motor 101_1/11_1/51_1 and corresponding a frequency of the filtered signal to a frequency of the at least one vibration motor 101_1/11_1/51_1.

Figure 5:
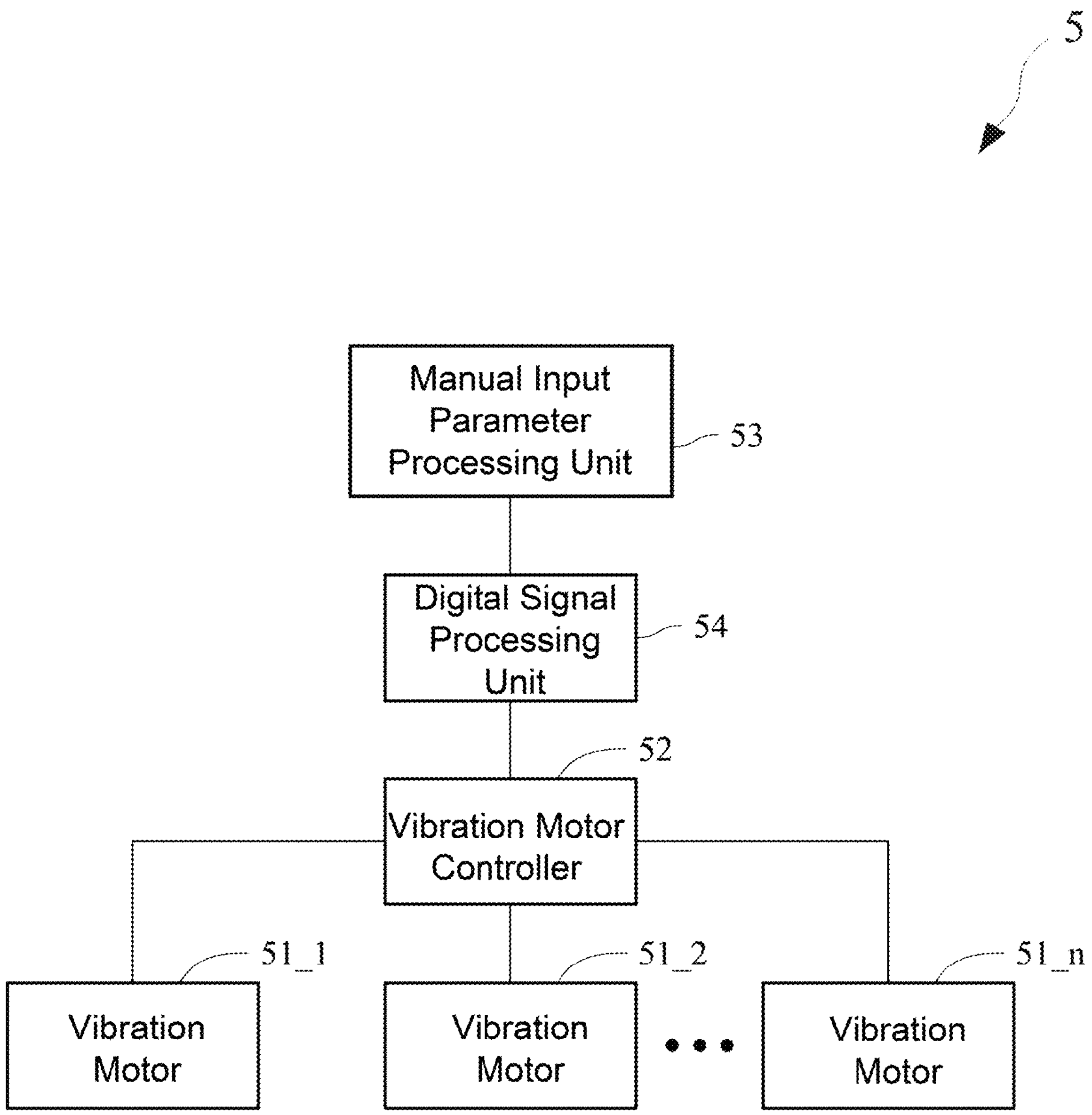
FIG. 5 is a diagram of yet another vibrotactile device according to one embodiment of the present disclosure.
Figure 6:
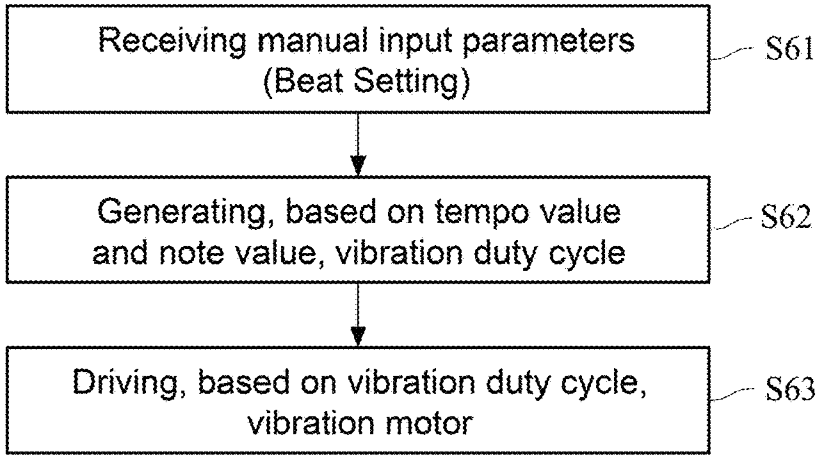
FIG. 6 is a process flow diagram illustrating a method for driving a vibration motor of the vibrotactile device of FIG. 5 according to one embodiment of the present disclosure.
Figure 7:
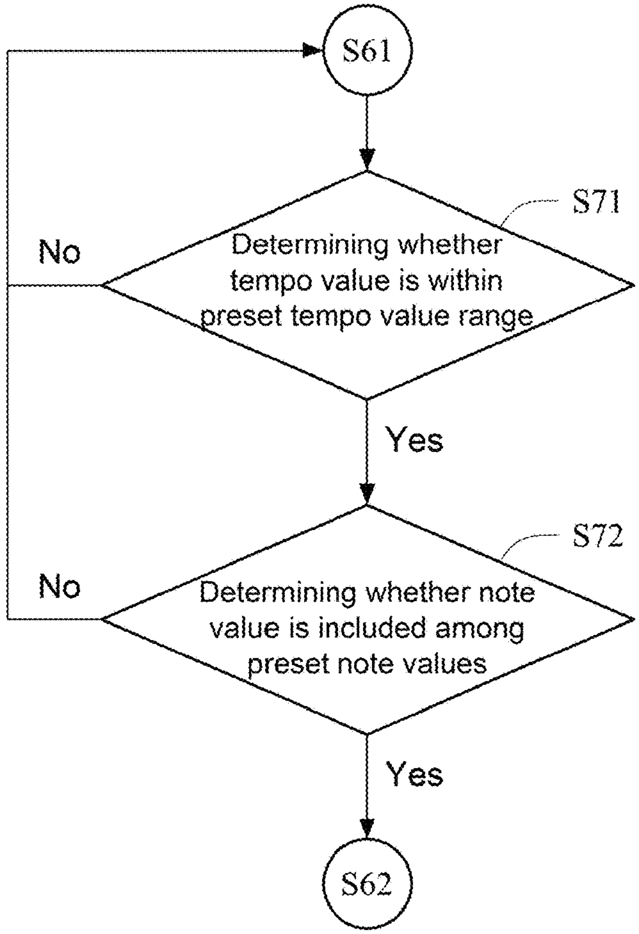
FIG. 7 is a process flow diagram illustrating another method for driving the vibration motor of the vibrotactile device of FIG. 5 according to one embodiment of the present disclosure.

FIGS. 5 to 7 include yet another embodiment of a vibrotactile device 10/1/5. The microcontroller 105/1051-1052/14/54 generates a vibration duty cycle (S62) based on a tempo value and a note value of a beat setting of the manual parameter input unit 103/53 to generate the at least one driving parameter (S22/S23/S62). In at least one embodiment, the microcontroller 105/1051-1052/14/54 further generates the vibration duty cycle by dividing a first value by a second value. The first value is generated by dividing a preset duty cycle length of the at least one vibration motor 101_1/11_1/51_1 by the tempo value. The second value is generated by dividing a preset note value of the at least one vibration motor 101_1/11_1/51_1 by the note value. In at least one embodiment, the microcontroller 105/1051-1052/14/54 further generates the vibration duty cycle, prior to dividing the first value by the second value by determining whether the tempo value is within a preset tempo value range of the at least one vibration motor 101_1/11_1/51_1 (S71). Next, at least a second tempo value is received when the tempo value is not within the preset tempo value range and whether the at least a second tempo value is within the preset tempo value range is determined (S61/S71). Following, receiving of the at least a second tempo value and determining whether the at least a second tempo value is within the preset tempo value range is repeated when the at least a second tempo value is not within the preset tempo value range (S61/S71). Next, whether the note value is within a preset note value range of the at least one vibration motor 101_1/11_1/51_1 is determined when at least the tempo value or the at least a second tempo value is within the preset tempo value range (S72). After, at least a second note value is received when the note value is not within the preset note value range and whether the at least a second note value is within the preset note value range is determined (S71/S72). Next, repeating receival of the at least a second note value and repeating determination of whether the at least a second note value is within the preset note value range when the at least a second note value is not within the preset note value range (S72). Following, the tempo value and the note value for generation of the vibration duty cycle are determined (S62). In at least one embodiment, the vibration duty cycle (S62) is the at least one driving parameter which drives S24/S63 the at least one vibration motor 101_1/11_1/51_1.

Figure 8:
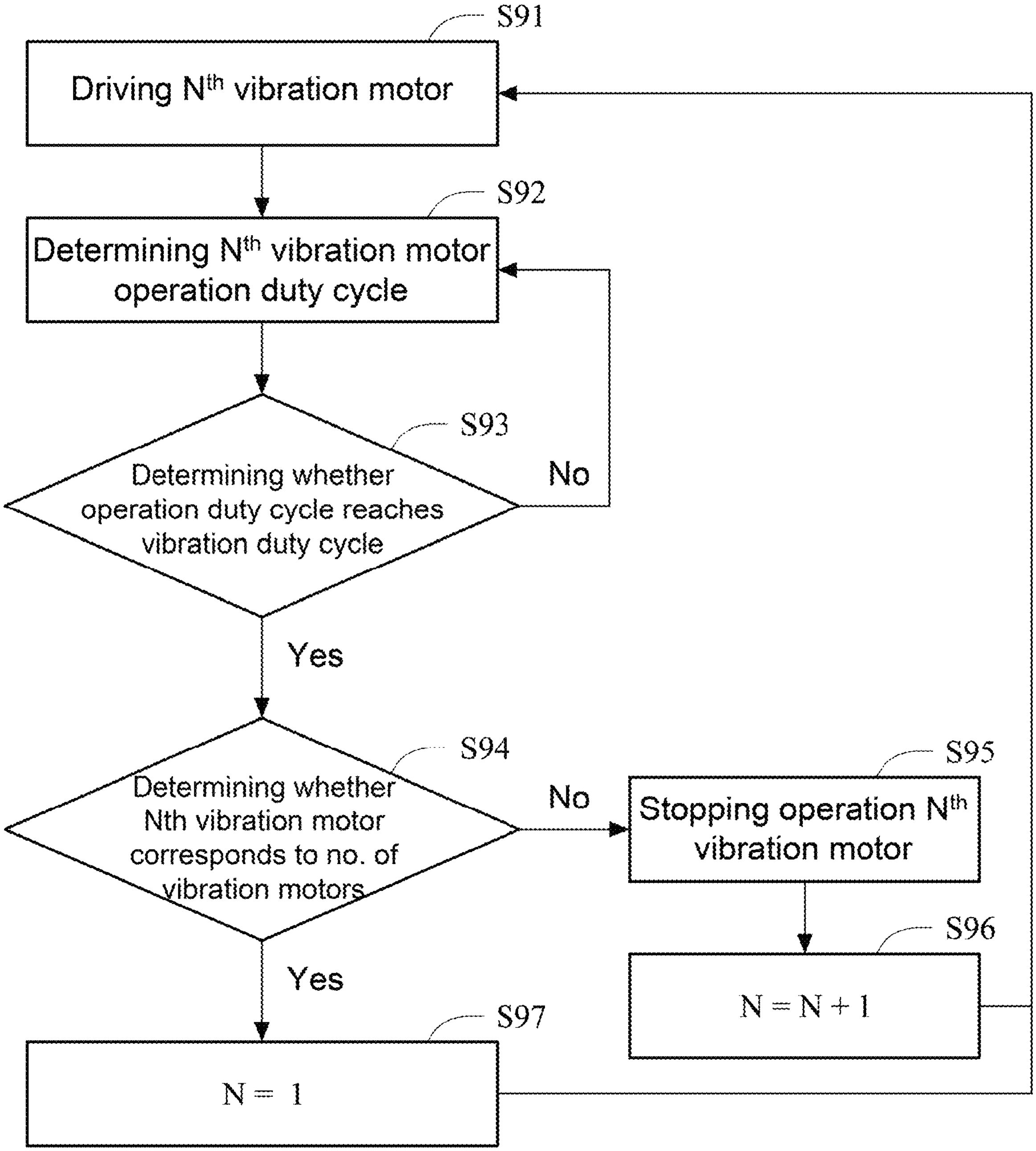
FIG. 8 is a process flow diagram illustrating yet another method for driving the vibration motor of the vibrotactile device of FIG. 1 according to one embodiment of the present disclosure.

FIG. 8 includes further yet another embodiment of a vibrotactile device 10/1/5. The at least one vibration motor 101_1/11_1/51_1 includes a plurality of vibration motors. The microcontroller 105/1051-1052/14/54 further generates the at least one driving parameter by identifying each of the plurality of vibration motors of an amount setting of the manual parameter input unit 103/53 and generating the vibration duty cycle based on the tempo value and the note value of each of the plurality of vibration motors (S62). In at least one embodiment, the microcontroller 105/1051-1052/14/54 drives each of the plurality of vibration motors by driving an $N^{th}$ vibration motor of the plurality of vibration motors (S91). Next, an $N^{th}$ operation duty cycle of the $N^{th}$ vibration motor is generated (S92) and whether the $N^{th}$ operation duty cycle reaches a vibration duty cycle of the $N^{th}$ vibration motor is determined (S93). At least an $N^{th}$ second operation duty cycle is generated when the $N^{th}$ operation duty cycle does not reach the vibration duty cycle and whether the $N^{th}$ second operation duty cycle reaches the vibration duty cycle is determined (S92/S93). Next, repeating generation of the at least an $N^{th}$ second operation duty cycle and repeating determination of whether the at least an $N^{th}$ second operation duty cycle reaches the vibration duty cycle when the at least an $N^{th}$ second operation duty cycle does not reach the vibration duty cycle (S92/S93). Following, whether the $N^{th}$ vibration motor corresponds to the amount setting is determined when at least the $N^{th}$ second operation duty cycle or the at least an $N^{th}$ second operation duty cycle does reach the vibration duty cycle (S94). Next, driving of the $N^{th}$ vibration motor is continued when the $N^{th}$ operation duty cycle corresponds to the amount setting (S97). Further, driving of the $N^{th}$ vibration motor is stopped (S95) when the $N^{th}$ operation duty cycle does not correspond to the amount setting and an $(N+1)^{th}$ vibration motor of the plurality of vibration motors is driven (S96). N is a positive integer and (N+1) is equal to or less than the amount setting.

Figure 9:
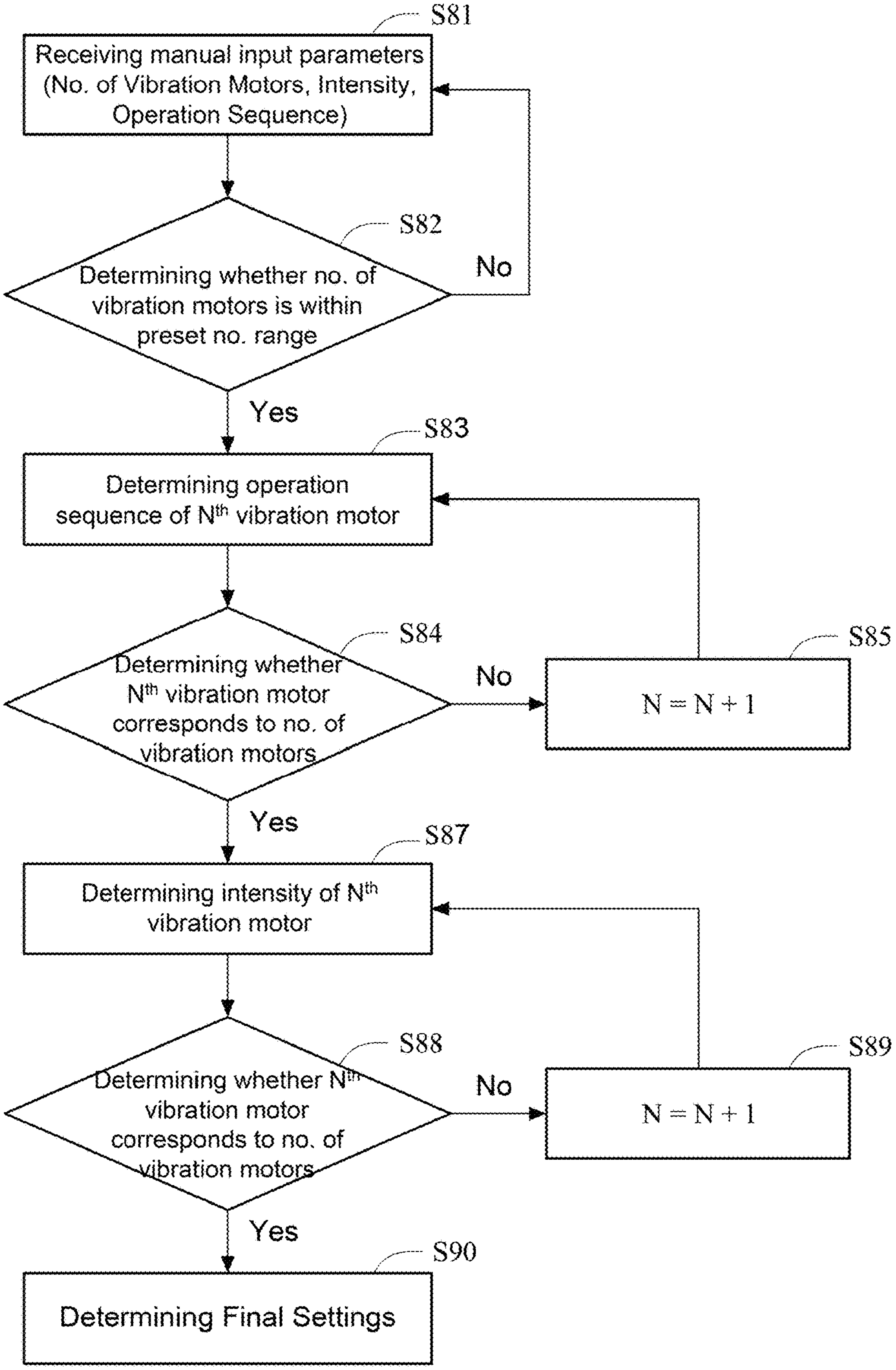
FIG. 9 is a process flow diagram illustrating further yet another method for driving the vibration motor of the vibrotactile device of FIG. 1 according to one embodiment of the present disclosure.

FIG. 9 includes another embodiment of a vibrotactile device 10/1/5. The microcontroller 105/1051-1052/14/54 further generates the at least one driving parameter by determining an operation sequence of each of the plurality of vibration motors of a sequence setting of the manual parameter input unit 103/53 and determining a vibration intensity of each of the plurality of vibration motors of a vibration intensity setting of the manual parameter input unit 103/53 (S81). In at least one embodiment, the microcontroller 105/1051-1052/14/54 further generates the vibration duty cycle (S62), prior to driving each of the plurality of vibration motors (S63), by determining whether the amount setting corresponds to a preset amount setting range of the plurality of vibration motors (S82). Next, at least a second amount setting is received when the amount setting does not correspond to the preset amount setting range and whether the at least a second amount setting is within the preset amount setting range is determined (S81/S82). Receiving of the at least a second amount setting and determining whether the at least a second amount setting is within the preset amount setting range are repeated when the at least a second amount setting is not within the preset amount setting range (S81/S82). An operation sequence of an $N^{th}$ vibration motor of the plurality of vibration motors is determined when at least the amount setting or the at least a second amount setting is within the preset amount setting range (S83). Next, whether the $N^{th}$ vibration motor corresponds to the amount setting is determined (S84) and an operation sequence of at least an $(N+1)^{th}$ vibration motor of the plurality of vibration motors is determined when the $N^{th}$ vibration motor does not correspond to the amount setting (S85/S83). Following, a vibration intensity of at least the $N^{th}$ vibration motor or the at least the $(N+1)^{th}$ vibration motor is determined when the $N^{th}$ vibration motor or the at least the $(N+1)^{th}$ vibration motor does correspond to the amount setting (S87). Whether at least the $N^{th}$ vibration motor or the at least the $(N+1)^{th}$ vibration motor corresponds to the amount setting is next determined (S88). A vibration intensity of at least the at least an $(N+1)^{th}$ vibration motor or at least an $(N+1+1)^{th}$ vibration motor is determined when at least the $N^{th}$ vibration motor or the at least an (N+1) th vibration motor does not correspond to the amount setting (S89/S87). Following, a final setting of manual input parameters is determined when at least the $N^{th}$ vibration motor, the at least an (N+1) th vibration motor, or the at least an $(N+1+1)^{th}$ vibration motor does correspond to the amount setting (S90).

Referring again to FIG. 1, in at least one embodiment, a method for providing vibrotactile sensations for an interface device includes at least one of at least two input units generating at least one signal (S21/S61). Next, a microcontroller 105/1051-1052/14/54 generates at least one driving parameter (S22/S23/S62), based, at least in part, on the at least one signal. Following, a vibration motor controller 102/12/52 drives (S24/S63) at least one vibration motor 101_1/11_1/51_1, based on the at least one driving parameter (S22/S23/S62).

Figure 4A:
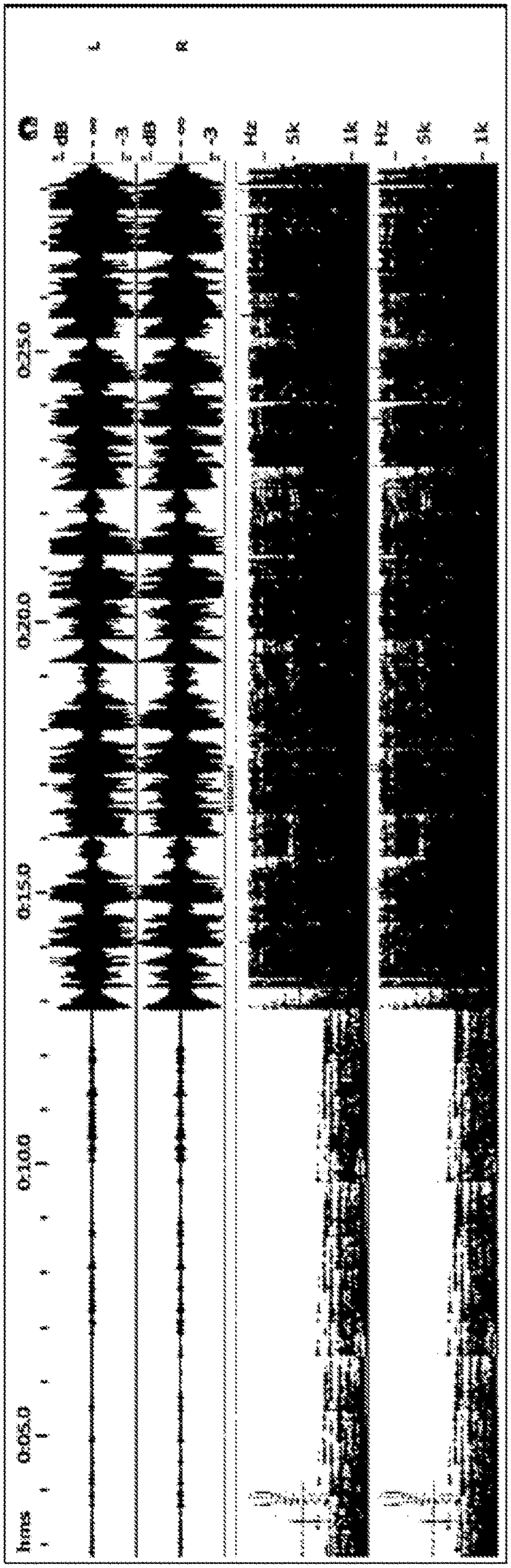
FIGS. 4A to 4D together constitute a process flow graph illustrating an example of processing an audio signal by the method of FIG. 3 according to one embodiment of the present disclosure.
Figure 4B:
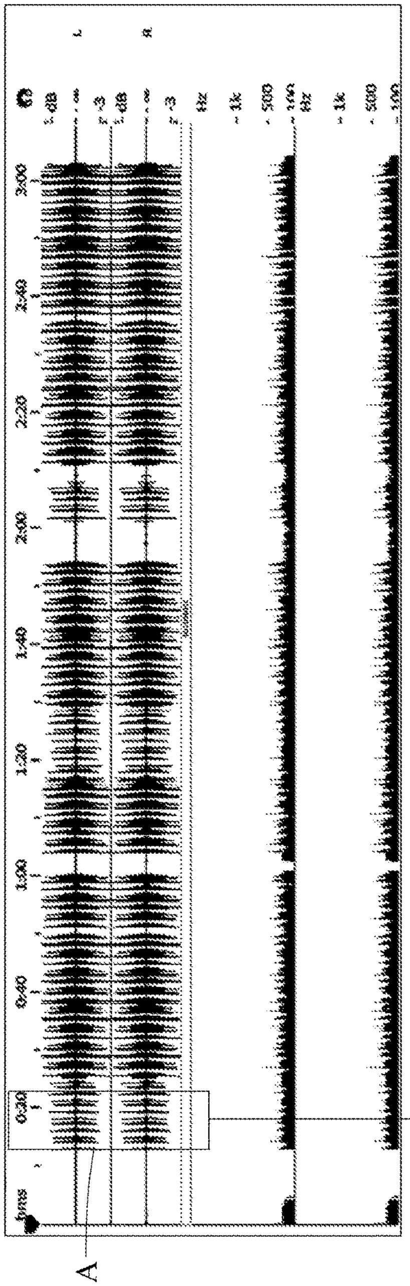
Figure 4C:
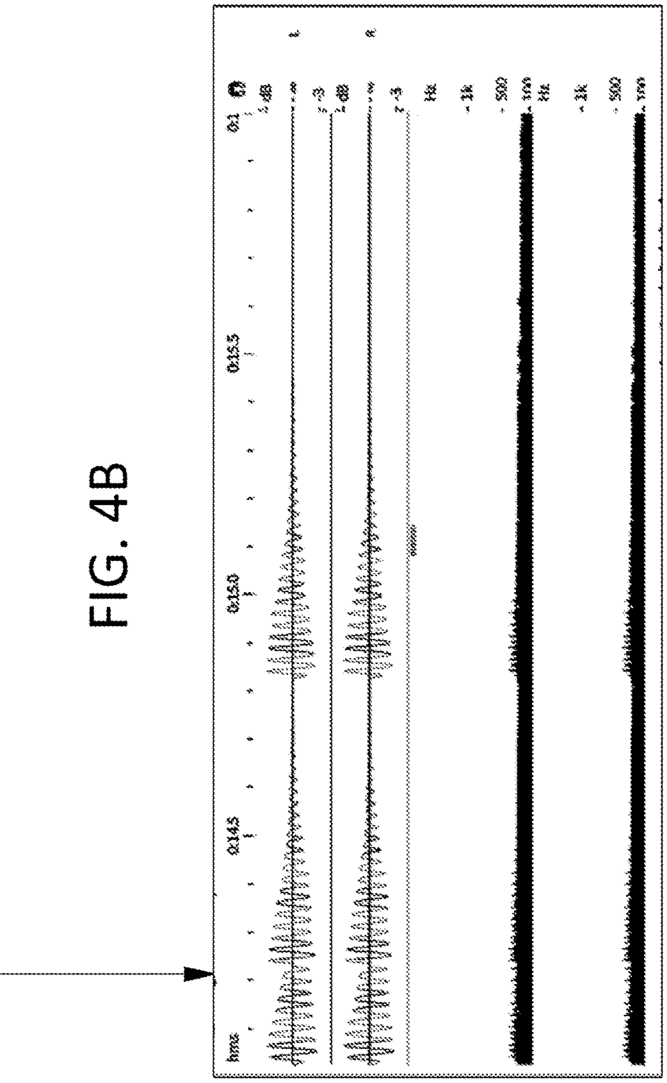

Referring again to FIGS. 2 to 4D, in at least one embodiment of the method, generating the at least one driving parameter (S22/S23/S62) includes attenuating frequencies above a threshold frequency while passing signals below the threshold frequency of the at least one signal (FIG. 4A) of an audio signal input unit 104/13 to generate a filtered signal (S22/FIG. 4B and FIG. 4C). Next, the filtered signal is compared with a vibration motor rated speed of the at least one vibration motor 101_1/11_1/51_1 to generate a modulated signal (S23). The threshold frequency is 100 Hz. In at least one embodiment of the method, generating the modulated signal (S23) further includes corresponding an amplitude of the filtered signal to an amplitude of the at least one vibration motor 101_1/11_1/51_1 and corresponding a frequency of the filtered signal to a frequency of the at least one vibration motor 101_1/11_1/51_1.

Figure 4D:
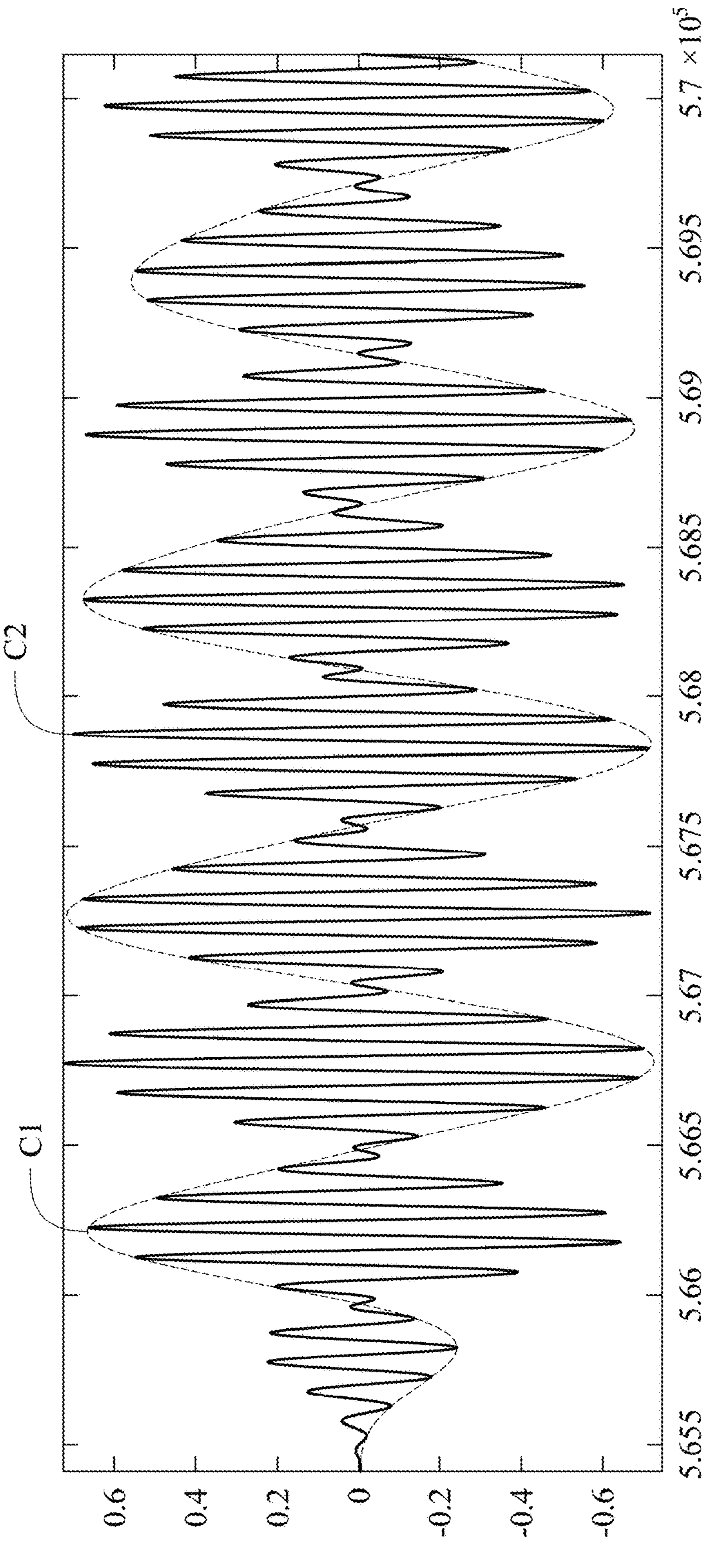

In at least one embodiment, the modulated signal can be generated based on the following equation: $S_v=S_{LP}\times\sin(2\pi\omega t)$, wherein $S_v$ is the modulated signal, $S_{LP}$ is the filtered signal, and w is the vibration motor rated speed of the at least one vibration motor 101_1/11_1/51_1. The modulated signal contains the amplitude and frequency of the at least one vibration motor 101_1/11_1/51_1. The modulated sinusoidal signal uses the vibration motor rated speed as the baseband frequency of frequency modulation. SLP provides an amplitude which is high enough so that users can feel rhythm. Referring to FIG. 4D, C1 is the modulated signal and C2 is the filtered signal. In at least one embodiment, the modulated signal is the at least one driving parameter which drives S24/S63 the at least one vibration motor 101_1/11_1/51_1.

Referring again to FIGS. 5 to 7, in at least one embodiment of the method, generating the at least one driving parameter (S22/S23/S62) includes generating a vibration duty cycle based on a tempo value and a note value of a beat setting of a manual parameter input unit 103/53. In at least one embodiment of the method, generating the vibration duty cycle further includes dividing a first value by a second value. The first value is generated by dividing a preset duty cycle length of the at least one vibration motor 101_1/11_1/51_1 by the tempo value. The second value is generated by dividing a preset note value of the at least one vibration motor 101_1/11_1/51_1 by the note value. In at least one embodiment of the method, generating the vibration duty cycle further includes, prior to dividing the first value by the second value, determining whether the tempo value is within a preset tempo value range of the at least one vibration motor 101_1/11_1/51_1 (S71). Next, at least a second tempo value is received when the tempo value is not within the preset tempo value range and determining whether the at least a second tempo value is within the preset tempo value range is determined (S61/S71). Following, receiving the at least a second tempo value and determining whether the at least a second tempo value is within the preset tempo value range are repeated when the at least a second tempo value is not within the preset tempo value range (S61/S71). Next, whether the note value is within a preset note value range of the at least one vibration motor 101_1/11_1/51_1 is determined when at least the tempo value or the at least a second tempo value is within the preset tempo value range (S72). Following, at least a second note value is received when the note value is not within the preset note value range and whether the at least a second note value is within the preset note value range is determined (S71/S72). Next, receiving of the at least a second note value and determining whether the at least a second note value is within the preset note value range are repeated when the at least a second note value is not within the preset note value range (S72). Next, the tempo value and the note value for generation of the vibration duty cycle is determined (S62).

In at least one embodiment, the vibration duty cycle (S62) can be generated based on the following equation:

$$T = \frac{\left(\frac{60\ \mathrm{S}}{\mathrm{BPM}}\right)}{\left(\frac{Quarter_{Note}}{\mathrm{NOTE}}\right)},$$

wherein T is the vibration duty cycle (S62), $60_s$ is the preset duty cycle length of 60 seconds, BPM is the tempo value included in the beat setting command, QuarterNote is the preset note value of ¼, and NOTE is the note value included in the beat setting command. As an example, when the tempo value is 200 BPM and the note value is 1⁄16, the first value is 0.3 seconds (60 seconds/200 BPM) and the second value is 4 (¼ divided by 1⁄16), and 0.3/4 equals 0.075 seconds, or the vibration duty cycle (S62) is 75 milliseconds.

Referring again to FIG. 8, in at least one embodiment of the method, the at least one vibration motor 101_1/11_1/51_1 includes a plurality of vibration motors, and generating the at least one driving parameter includes identifying each of the plurality of vibration motors of an amount setting of the manual parameter input unit 103/53 and generating the vibration duty cycle based on the tempo value and the note value of each of the plurality of vibration motors (S62). In at least one embodiment of the method, driving each of the plurality of vibration motors includes driving an $N^{th}$ vibration motor of the plurality of vibration motors (S91). Next, an $N^{th}$ operation duty cycle of the $N^{th}$ vibration motor is generated (S92). Whether the $N^{th}$ operation duty cycle reaches a vibration duty cycle of the $N^{th}$ vibration motor is next determined (S93). Following, at least an $N^{th}$ second operation duty cycle is generated when the $N^{th}$ operation duty cycle does not reach the vibration duty cycle and whether the $N^{th}$ second operation duty cycle reaches the vibration duty cycle is determined (S92/S93). Next, generating of the at least an $N^{th}$ second operation duty cycle and determining whether the at least an $N^{th}$ second operation duty cycle reaches the vibration duty cycle are repeated when the at least an $N^{th}$ second operation duty cycle does not reach the vibration duty cycle (S92/S93). Following, whether the $N^{th}$ vibration motor corresponds to the amount setting is determined when at least the $N^{th}$ second operation duty cycle or the at least an $N^{th}$ second operation duty cycle does reach the vibration duty cycle (S94). Next, driving of the $N^{th}$ vibration motor when the $N^{th}$ operation duty cycle corresponds to the amount setting is continued (S97). Driving of the $N^{th}$ vibration motor is stopped when the $N^{th}$ operation duty cycle does not correspond to the amount setting (S95) and an $(N+1)^{th}$ vibration motor of the plurality of vibration motors is driven (S96). N is a positive integer and (N+1) is equal to or less than the amount setting.

Referring again to FIG. 9, in at least one embodiment of the method, generating the at least one driving parameter further includes determining an operation sequence of each of the plurality of vibration motors of a sequence setting of the manual parameter input unit 103/53 and determining a vibration intensity of each of the plurality of vibration motors of a vibration intensity setting of the manual parameter input unit 103/53 (S81). In at least one embodiment of the method, generating the vibration duty cycle (S62) further includes, prior to driving each of the plurality of vibration motors (S63), determining whether the amount setting corresponds to a preset amount setting range of the plurality of vibration motors (S82). Next, at least a second amount setting is received when the amount setting does not correspond to the preset amount setting range and whether the at least a second amount setting is within the preset amount setting range is determined (S81). Following, receiving of the at least a second amount setting and determining whether the at least a second amount setting is within the preset amount setting range are repeated when the at least a second amount setting is not within the preset amount setting range (S81/S82). Next, an operation sequence of an $N^{th}$ vibration motor of the plurality of vibration motors is determined when at least the amount setting or the at least a second amount setting is within the preset amount setting range (S83). Following, whether the $N^{th}$ vibration motor corresponds to the amount setting is determined (S84). Next, an operation sequence of at least an $(N+1)^{th}$ vibration motor of the plurality of vibration motors is determined when the $N^{th}$ vibration motor does not correspond to the amount setting (S85/S83). Next, a vibration intensity of at least the $N^{th}$ vibration motor or the at least the (N+1) th vibration motor is determined when the $N^{th}$ vibration motor or the at least the $(N+1)^{th}$ vibration motor does correspond to the amount setting (S87). Following, whether at least the $N^{th}$ vibration motor or the at least the (N+1) th vibration motor corresponds to the amount setting is determined (S88), and a vibration intensity of at least the at least an $(N+1)^{th}$ vibration motor or at least an $(N+1+1)^{th}$ vibration motor is determined when at least the $N^{th}$ vibration motor or the at least an $(N+1)^{th}$ vibration motor does not correspond to the amount setting (S89/S87). Next, a final setting of manual input parameters is determined when at least the $N^{th}$ vibration motor, the at least an $(N+1)^{th}$ vibration motor, or the at least an $(N+1+1)^{th}$ vibration motor does correspond to the amount setting (S90).

The audio processor (1051/14), as an example, can be a digital signal processor (DSP). The audio processor (1051/14) can include a low-pass filtering device or circuit to perform low-pass filtering on the at least one signal and/or an amplitude modulation modulator or circuit to perform amplitude modulation on the at least one signal. The microcontroller 105/1051-1052/14/54, as an example, can include the audio processor (1051/14). The microcontroller 105/1051-1052/14/54 can include a low-pass filtering device or circuit to perform low-pass filtering on the at least one signal and/or an amplitude modulation modulator or circuit to perform amplitude modulation on the at least one signal. In at least one embodiment, the performing of low-pass filtering and amplitude modulation can be implemented by hardware and/or software. The vibration motor controller 102/12/52, as an example, can be a motor control circuit or a programmable logic controller (PLC).

The microcontroller 105/1051-1052/14/54, as an example, can be a digital signal processor (DSP). In at least one embodiment, the microcontroller 105/1051-1052/14/54 can perform pulse width modulation.

In at least one embodiment, a shape of the at least one vibration motor 101_1/11_1/51_1 can be flat and a plurality of vibration motors can be implemented covering a relatively small surface area, as an example, such as a surface area of a drum stool. In at least one embodiment, the at least one signal can be received via, as examples, microphone input connections, auxiliary input connections, USB connections (e.g., MP3 file), and wireless connections.

In at least one embodiment, the preset tempo value range is between 10 BPM to 200 BPM, inclusive. The preset note values can be quarter notes, eight notes, sixteenth notes, triplet notes, triplet rest notes. The tempo value can include beat per minute (BPM) and the note value can be quarter notes, eight notes, triplet notes, triplet rest notes or the like. The rated speed can include a rated speed of revolution per minute (RMP) of the vibration motor.

In at least one embodiment, inputting of the tempo value, note value, amount setting, sequence setting, and vibration intensity setting of the manual parameter input unit 103/53 can be implemented using buttons, a touch panel display, and/or via audio input.

The vibrotactile device 10/1/5 and method for providing vibrotactile sensations for an interface device (FIGS. 3 and 6 to 9) of the present disclosure provide multiple means for obtaining the at least one signal. The at least one signal can be received via, as examples, microphone input connections, auxiliary input connections, USB connections, and wireless connections. A modulated signal is generated based, in part, on a filtered signal from the audio signal input unit 104/13. The modulated signal can be generated based on comparison between the filtered signal with a vibration motor rated speed, based on corresponding an amplitude of the filtered signal to an amplitude of the at least one vibration motor 101_1/11_1/51_1, and/or based on corresponding a frequency of the filtered signal to a frequency of the at least one vibration motor 101_1/11_1/51_1, to generate at least one driving parameter. The at least one signal can be received via, as examples, a tempo value and a note value set by a user via the manual parameter input unit 103/53. A vibration duty cycle (S62) can be generated, based on the tempo value and the note value of the manual parameter input unit 103/53, to generate at least one driving parameter. A first value, based in part, on the tempo value, can be divided by a second value, based in part, on the note value, to generate at least one driving parameter. Thus, multiple means for obtaining the at least one signal and multiple means for obtaining the at least one driving parameter are provided, offering variability for the vibration motor controller 102/12/52 to drive the at least one vibration motor 101_1/11_1/51_1 via the at least one driving parameter based, at least in part, on the at least one signal, assuring operational accuracy to enhance user experience and encourage engagement.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method for providing vibrotactile sensations for an interface device, comprising:

generating, with an input unit, a first signal;

generating, with a microcontroller, based on the first signal, at least one driving parameter includes attenuating frequencies above a threshold frequency while passing signals below the threshold frequency of the first signal, to generate a filtered signal, and then generating, based on comparison between the filtered signal with a vibration motor rated speed of at least one vibration motor of a plurality of vibration motors, a modulated signal, wherein the threshold frequency is 100 Hz; and driving, with a vibration motor controller, based on the at least one driving parameter, at least one vibration motor, the plurality of vibration motors sequentially, wherein driving includes:

driving an $N^{th}$ vibration motor of the plurality of vibration motors, generating an $N^{th}$ operation duty cycle of the $N^{th}$ vibration motor, determining whether the $N^{th}$ operation duty cycle reaches a vibration duty cycle of the $N^{th}$ vibration motor, generating at least an $N^{th}$ second operation duty cycle when the $N^{th}$ operation duty cycle does not reach the vibration duty cycle and determining whether the $N^{th}$ second operation duty cycle reaches the vibration duty cycle, repeating, generating of the at least an $N^{th}$ second operation duty cycle and determining whether the at least an $N^{th}$ second operation duty cycle reaches the vibration duty cycle when the at least an $N^{th}$ second operation duty cycle does not reach the vibration duty cycle, determining whether the $N^{th}$ vibration motor corresponds to the amount setting when at least the $N^{th}$ second operation duty cycle or the at least an $N^{th}$ second operation duty cycle does reach the vibration duty cycle, continuing, driving of the $N^{th}$ vibration motor when the $N^{th}$ operation duty cycle corresponds to the amount setting, stopping, driving of the $N^{th}$ vibration motor when the $N^{th}$ operation duty cycle does not correspond to the amount setting, and driving an $(N+1)^{th}$ vibration motor of the plurality of vibration motors, wherein N is a positive integer and (N+1) is equal to or less than the amount setting.

2. The method of claim 1, wherein the input unit is an audio signal input unit.

3. The method of claim 2, wherein generating the modulated signal further includes an amplitude of the filtered signal corresponding to an amplitude of the at least one vibration motor and a frequency of the filtered signal corresponding to a frequency of the at least one vibration motor.

4. The method of claim 1, wherein the input unit is a manual parameter input unit, and generating the at least one driving parameter includes identifying each of the plurality of vibration motors of the amount setting of the manual parameter input unit and generating a vibration duty cycle based on a tempo value and a note value of a beat setting of the manual parameter input unit.

5. The method of claim 4, wherein generating the vibration duty cycle further includes dividing a first value by a second value, wherein the first value is generated by dividing a preset duty cycle length of each of the plurality of vibration motors by the tempo value and the second value is generated by dividing a preset note value of each of the plurality of vibration motors by the note value.

6. The method of claim 5, wherein generating the vibration duty cycle further includes, prior to dividing the first value by the second value, determining whether the tempo value is within a preset tempo value range of each of the plurality of vibration motors, receiving at least a second tempo value when the tempo value is not within the preset tempo value range and determining whether the at least a second tempo value is within the preset tempo value range, repeating, receiving of the at least a second tempo value and determining whether the at least a second tempo value is within the preset tempo value range when the at least a second tempo value is not within the preset tempo value range, determining whether the note value is within a preset note value range of each of the plurality of vibration motors when at least the tempo value or the at least a second tempo value is within the preset tempo value range, receiving at least a second note value when the note value is not within the preset note value range and determining whether the at least a second note value is within the preset note value range, repeating, receiving of the at least a second note value and determining whether the at least a second note value is within the preset note value range when the at least a second note value is not within the preset note value range, and determining the tempo value and the note value for generation of the vibration duty cycle.

7. The method of claim 4, wherein generating the at least one driving parameter further includes determining an operation sequence of each of the plurality of vibration motors of a sequence setting of the manual parameter input unit and determining a vibration intensity of each of the plurality of vibration motors of a vibration intensity setting of the manual parameter input unit.

8. The method of claim 7, wherein generating the vibration duty cycle further includes, prior to driving each of the plurality of vibration motors, determining whether the amount setting corresponds to a preset amount setting range of the plurality of vibration motors, receiving at least a second amount setting when the amount setting does not correspond to the preset amount setting range and determining whether the at least a second amount setting is within the preset amount setting range, repeating, receiving of the at least a second amount setting and determining whether the at least a second amount setting is within the preset amount setting range when the at least a second amount setting is not within the preset amount setting range, determining an operation sequence of an $N^{th}$ vibration motor of the plurality of vibration motors when at least the amount setting or the at least a second amount setting is within the preset amount setting range, determining whether the $N^{th}$ vibration motor corresponds to the amount setting, determining an operation sequence of at least an $(N+1)^{th}$ vibration motor of the plurality of vibration motors when the $N^{th}$ vibration motor does not correspond to the amount setting, determining a vibration intensity of at least the $N^{th}$ vibration motor or the at least the $(N+1)^{th}$ vibration motor when the $N^{th}$ vibration motor or the at least the $(N+1)^{th}$ vibration motor does correspond to the amount setting, determining whether at least the $N^{th}$ vibration motor or the at least the $(N+1)^{th}$ vibration motor corresponds to the amount setting, determining a vibration intensity of at least the at least an $(N+1)^{th}$ vibration motor or at least an $(N+1+1)^{th}$ vibration motor when at least the $N^{th}$ vibration motor or the at least an $(N+1)^{th}$ vibration motor does not correspond to the amount setting, determining a final setting of manual input parameters when at least the $N^{th}$ vibration motor, the at least an $(N+1)^{th}$ vibration motor, or the at least an $(N+1+1)^{th}$ vibration motor does correspond to the amount setting.

9. A vibrotactile device, comprising:

an audio signal input unit configured to generate a first signal;

a manual parameter input unit configured to generate a second signal;

a microcontroller coupled to the audio signal input unit and coupled to the manual parameter input unit;

an audio processor coupled between the audio signal input unit and the microcontroller; attenuating frequencies above a threshold frequency while passing signals below the threshold frequency of the first signal to generate a filtered signal, and then generating a modulated signal based on a comparison between the filtered signal with a vibration motor rated speed of at least one vibration motor of a plurality of vibration motors, wherein the threshold frequency is 100 Hz;

a vibration motor controller coupled to the microcontroller; and the plurality of vibration motors coupled to the vibration motor controller, wherein the microcontroller generates at least one driving parameter based on at least one of the first signal or the second signal, and the vibration motor controller drives the plurality of vibration motors sequentially based on the at least one driving parameter, wherein the vibration motor controller:

drives an Nth vibration motor of the plurality of vibration motors, generates an Nth operation duty cycle of the Nth vibration motor, iteratively determines whether the Nth operation duty cycle reaches a vibration duty cycle of the Nth vibration motor and generates at least an Nth second operation duty cycle when the Nth operation duty cycle does not reach the vibration duty cycle until the vibration duty cycle is reached, determines whether the Nth vibration motor corresponds to an amount setting when the vibration duty cycle is reached, continues driving of the Nth vibration motor when the Nth vibration motor corresponds to the amount setting, and stops driving of the Nth vibration motor and drives an (N+1)th vibration motor when the Nth vibration motor does not correspond to the amount setting, wherein N is a positive integer and (N+1) is equal to or less than the amount setting.

10. The vibrotactile device of claim 9, wherein the audio processor further generates the modulated signal based on corresponding an amplitude of the filtered signal to an amplitude of the at least one vibration motor and corresponding a frequency of the filtered signal to a frequency of the at least one vibration motor.

11. The vibrotactile device of claim 9, wherein the microcontroller generates a vibration duty cycle based on a tempo value and a note value of a beat setting of the manual parameter input unit to generate the at least one driving parameter, and wherein the microcontroller identifies each of the plurality of vibration motors of the amount setting of the manual parameter input unit.

12. The vibrotactile device of claim 11, wherein the microcontroller further generates the vibration duty cycle by dividing a first value by a second value, wherein the first value is generated by dividing a preset duty cycle length of each of the plurality of vibration motors by the tempo value and the second value is generated by dividing a preset note value of each of the plurality of vibration motors by the note value.

13. The vibrotactile device of claim 12, wherein the microcontroller further generates the vibration duty cycle, prior to dividing the first value by the second value by, determining whether the tempo value is within a preset tempo value range of each of the plurality of vibration motors, receiving at least a second tempo value when the tempo value is not within the preset tempo value range and determining whether the at least a second tempo value is within the preset tempo value range, repeating, receiving of the at least a second tempo value and determining whether the at least a second tempo value is within the preset tempo value range when the at least a second tempo value is not within the preset tempo value range, determining whether the note value is within a preset note value range of each of the plurality of vibration motors when at least the tempo value or the at least a second tempo value is within the preset tempo value range, receiving at least a second note value when the note value is not within the preset note value range and determining whether the at least a second note value is within the preset note value range, repeating, receiving of the at least a second note value and determining whether the at least a second note value is within the preset note value range when the at least a second note value is not within the preset note value range, and determining the tempo value and the note value for generation of the vibration duty cycle.

14. The vibrotactile device of claim 11, wherein the microcontroller further generates the at least one driving parameter by determining an operation sequence of each of the plurality of vibration motors of a sequence setting of the manual parameter input unit and determining a vibration intensity of each of the plurality of vibration motors of a vibration intensity setting of the manual parameter input unit.

15. The vibrotactile device of claim 14, wherein the microcontroller further generates the vibration duty cycle, prior to driving each of the plurality of vibration motors, by determining whether the amount setting corresponds to a preset amount setting range of the plurality of vibration motors, receiving at least a second amount setting when the amount setting does not correspond to the preset amount setting range and determining whether the at least a second amount setting is within the preset amount setting range, repeating, receiving of the at least a second amount setting and determining whether the at least a second amount setting is within the preset amount setting range when the at least a second amount setting is not within the preset amount setting range, determining an operation sequence of an $N^{th}$ vibration motor of the plurality of vibration motors when at least the amount setting or the at least a second amount setting is within the preset amount setting range, determining whether the $N^{th}$ vibration motor corresponds to the amount setting, determining an operation sequence of at least an $(N+1)^{th}$ vibration motor of the plurality of vibration motors when the $N^{th}$ vibration motor does not correspond to the amount setting, determining a vibration intensity of at least the $N^{th}$ vibration motor or the at least the $(N+1)^{th}$ vibration motor when the $N^{th}$ vibration motor or the at least the $(N+1)^{th}$ vibration motor does correspond to the amount setting, determining whether at least the $N^{th}$ vibration motor or the at least the $(N+1)^{th}$ vibration motor corresponds to the amount setting, determining a vibration intensity of at least the at least an $(N+1)^{th}$ vibration motor or at least an $(N+1+1)^{th}$ vibration motor when at least the $N^{th}$ vibration motor or the at least an $(N+1)^{th}$ vibration motor does not correspond to the amount setting, determining a final setting of manual input parameters when at least the $N^{th}$ vibration motor, the at least an $(N+1)^{th}$ vibration motor, or the at least an $(N+1+1)^{th}$ vibration motor does correspond to the amount setting.

* * * * *